US009409380B2

(12) United States Patent
Kohler

(10) Patent No.: US 9,409,380 B2
(45) Date of Patent: Aug. 9, 2016

(54) ANTI-FOG MIRROR APPARATUS HAVING A MULTI-LAYER FILM

(71) Applicant: MCS Industries, Inc., Easton, PA (US)

(72) Inventor: Dallas Aaron Kohler, Schnecksville, PA (US)

(73) Assignee: MCS INDUSTRIES, INC.

( * ) Notice: Subject to any disclaimer, the term of this patent is extended or adjusted under 35 U.S.C. 154(b) by 0 days.

(21) Appl. No.: 14/530,420

(22) Filed: Oct. 31, 2014

(65) Prior Publication Data

US 2015/0174870 A1 Jun. 25, 2015

(51) Int. Cl.

| B32B 7/12 | (2006.01) |
| B32B 7/00 | (2006.01) |
| B32B 7/02 | (2006.01) |
| B32B 7/10 | (2006.01) |
| B32B 27/00 | (2006.01) |
| B32B 27/06 | (2006.01) |
| B32B 27/36 | (2006.01) |
| B32B 27/40 | (2006.01) |
| B32B 37/02 | (2006.01) |
| B32B 38/10 | (2006.01) |
| B32B 38/16 | (2006.01) |
| B32B 38/00 | (2006.01) |

(52) U.S. Cl.
CPC ... *B32B 7/12* (2013.01); *B32B 7/00* (2013.01); *B32B 7/02* (2013.01); *B32B 7/10* (2013.01); *B32B 27/00* (2013.01); *B32B 27/06* (2013.01); *B32B 27/36* (2013.01); *B32B 27/40* (2013.01); *B32B 37/02* (2013.01); *B32B 38/10* (2013.01); *B32B 38/162* (2013.01); *B32B 38/1875* (2013.01); *B32B 2250/04* (2013.01); *B32B 2307/40* (2013.01); *B32B 2307/416* (2013.01); *B32B 2307/584* (2013.01); *B32B 2307/71* (2013.01); *B32B 2307/7145* (2013.01); *B32B 2309/02* (2013.01); *B32B 2309/65* (2013.01); *B32B 2571/00* (2013.01); *Y10T 428/2495* (2015.01); *Y10T 428/24967* (2015.01)

(58) Field of Classification Search
None
See application file for complete search history.

(56) References Cited

U.S. PATENT DOCUMENTS

| 4,467,073 A | 8/1984 | Creasy |
| 5,402,265 A | 3/1995 | Jahoda et al. |
| 5,743,981 A | 4/1998 | Lu |
| 5,877,254 A | 3/1999 | La Casse et al. |
| 6,111,696 A * | 8/2000 | Allen ................ G02B 5/3008 349/96 |
| 6,287,658 B1 | 9/2001 | Cosentino et al. |
| 6,455,142 B1 | 9/2002 | Heberger et al. |
| 6,482,489 B1 | 11/2002 | Otaki et al. |
| 7,052,774 B2 | 5/2006 | Holzer et al. |
| 7,332,216 B2 | 2/2008 | Hashimoto et al. |
| 7,579,130 B2 | 8/2009 | Kobayashi et al. |
| 7,891,154 B2 | 2/2011 | Cording |
| 7,914,158 B2 | 3/2011 | Schulz et al. |
| 7,982,380 B2 | 7/2011 | Kamiyama et al. |
| 8,642,180 B2 | 2/2014 | Iwazumi et al. |
| 2003/0198764 A1 | 10/2003 | Kendig |
| 2004/0115457 A1* | 6/2004 | Kong .................. B32B 7/06 428/515 |
| 2004/0126514 A1* | 7/2004 | McGee ................ B32B 3/26 428/34.1 |
| 2006/0047064 A1 | 3/2006 | Murata et al. |
| 2006/0077549 A1 | 4/2006 | Kikuchi et al. |
| 2007/0291345 A1* | 12/2007 | Kumar ................ B29C 55/12 359/241 |
| 2007/0298229 A1 | 12/2007 | Rasmusson et al. |
| 2008/0063857 A1 | 3/2008 | Konrad et al. |
| 2008/0113133 A1 | 5/2008 | Fackler et al. |
| 2008/0160187 A1 | 7/2008 | Murata et al. |
| 2008/0187728 A1 | 8/2008 | Borowiec et al. |
| 2008/0213553 A1 | 9/2008 | Hwang |
| 2008/0233375 A1* | 9/2008 | Wright ................ C08J 5/18 428/219 |
| 2009/0053465 A1 | 2/2009 | Scherg et al. |
| 2009/0181242 A1 | 7/2009 | Enniss et al. |
| 2010/0009198 A1 | 1/2010 | Kaneda et al. |
| 2010/0159256 A1 | 6/2010 | Yamasaki et al. |
| 2010/0253893 A1 | 10/2010 | Shin et al. |
| 2011/0170190 A1 | 7/2011 | Simunic |
| 2012/0019906 A1* | 1/2012 | Van Nuffel ............ B32B 27/18 359/359 |
| 2012/0067767 A1 | 3/2012 | Shirrell et al. |
| 2013/0157066 A1 | 6/2013 | Cheng et al. |
| 2013/0164551 A1 | 6/2013 | Daum |

FOREIGN PATENT DOCUMENTS

| IT | 1181814 | 9/1987 |
| JP | 4189305 | 6/2005 |
| KR | 20000052022 | 8/2000 |
| TW | M432058 | 6/2012 |
| WO | 2006051604 | 5/2006 |
| WO | 2013026612 | 2/2013 |

OTHER PUBLICATIONS http://www.fsicti.com/index.php?pid=34&lid=1, Superior Solutions, FSI Coating Technologies.
Corresponding International Search Report and Written Opinion for PCT/US2015/058582 dated Jan. 27, 2016.

* cited by examiner

*Primary Examiner* — Bilkis Jahan
(74) *Attorney, Agent, or Firm* — Belles Katz LLC

(57) ABSTRACT

Described herein are reflective surface coverings comprising: a reflective substrate; and a multi-layer film comprising: a first thermoplastic polymeric resin layer; a thermally activated adhesive layer; and a second thermoplastic polymeric resin layer; wherein the thickness ratio between the thermally activated adhesive layer and the first thermoplastic polymeric resin layer is from about 1.25:1 to about 2.75:1. Methods of making and using the reflective surface coverings are also described.

20 Claims, No Drawings

ANTI-FOG MIRROR APPARATUS HAVING A MULTI-LAYER FILM

FIELD OF THE DISCLOSURE

The present disclosure relates to aesthetically pleasing reflective surface coverings having anti-fog properties.

BACKGROUND

Compositions and coatings which provide anti-fog and scratch-resistant surfaces are known. However, when these compositions and coatings are applied to a surface, they can adversely impact the aesthetics and/or functionality of the surface to which they are applied. For example, the application of certain anti-fog compositions and coatings result in surfaces with imperfections and/or discoloration. Surface imperfections and discoloration may not be an issue for some surfaces, e.g. containers or refrigerator doors; however, surface coverings that require a certain level of reflectivity have little tolerance for surface imperfections or discoloration. Thus, there remains a need for reflective surface coverings which avoid discoloration and surface imperfections. Embodiments of the present invention are designed to meet these needs.

SUMMARY

In some embodiments, the present invention provides a reflective surface covering comprising: a reflective substrate; and a multi-layer film comprising: a thermoplastic polymeric resin layer; a thermally activated adhesive layer; and a second thermoplastic polymeric resin layer; wherein the thickness ratio between the thermally activated adhesive layer and the first thermoplastic polymeric resin layer is from about 1.25:1 to about 2.75:1.

Other embodiments of the present invention provide a reflective surface covering comprising: a substrate; and a multi-layer film comprising: a first thermoplastic polymeric resin layer; a thermally activated adhesive layer; and a second thermoplastic polymeric resin layer; wherein the thermally activated adhesive layer has a thickness of from about 140 μm to about 175 μm; and wherein the thermally activated adhesive layer is substantially free of UV additives.

Further embodiments provide a method of preparing a reflective surface covering comprising: a) providing a reflective substrate and a multi-layer film comprising: a protective layer; and an anti-fog complex comprising: a first thermoplastic polymeric resin layer; a thermally activated adhesive layer; and a second thermoplastic polymeric resin layer; b) laminating the multi-layer film and the reflective substrate together to form a laminated composite; c) maintaining the laminated composite in ambient conditions for a time sufficient to permit solidification of the multi-layer film; d) removing the protective layer from the laminated composite to expose the anti-fog complex; e) performing a post-lamination cleaning cycle.

DETAILED DESCRIPTION

As used herein, the term "complex" refers to a plurality of components that are connected.

In some embodiments, the present invention provides a reflective surface covering comprising: a reflective substrate; and a multi-layer film comprising: a first thermoplastic polymeric resin layer; a thermally activated adhesive layer; and a second thermoplastic polymeric resin layer; wherein the thickness ratio between the thermally activated adhesive layer and the first thermoplastic polymeric resin layer is from about 1.25:1 to about 2.75:1.

In some embodiments, the thickness ratio between the thermally activated adhesive layer and the first thermoplastic polymeric resin layer is from about 1.25:1 to about 2.5:1. In other embodiments, the thickness ratio between the thermally activated adhesive layer and the first thermoplastic polymeric resin layer is from about 1.25:1 to about 2.25:1. In further embodiments, the thickness ratio between the thermally activated adhesive layer and the first thermoplastic polymeric resin layer is from about 1.25:1 to about 2:1. In still further embodiments, the thickness ratio between the thermally activated adhesive layer and the first thermoplastic polymeric resin layer is about 1.5:1.

In some embodiments, the first thermoplastic polymeric resin layer comprises a polymer selected from: polymethyl methacrylate; a polyamide; polybenzamidazole; polyethylene; polypropylene; polystyrene; polyvinyl chloride; and polytetrafluoroethylene. In some embodiments, the first thermoplastic polymeric resin layer comprises polyethylene terephthalate.

In some embodiments, the reflective surface covering has a scratch/dig ratio between 120/80 and 10/5. In some embodiments, the reflective surface covering has a scratch/dig ratio between 80/50 and 20/10. In some embodiments, the reflective surface covering has a scratch/dig ratio between 60/40 and 40/20.

In some embodiments, the multi-layer film has a thickness of from about 250 μm to about 300 μm. In some embodiments, the multi-layer film has a thickness of from about 255 μm to about 295 μm. In some embodiments, the multi-layer film has a thickness of from about 260 μm to about 290 μm. In some embodiments, the multi-layer film has a thickness of from about 265 μm to about 285 μm. In some embodiments, the multi-layer film has a thickness of from about 270 μm to about 280 μm. In some embodiments, the multi-layer film has a thickness of about 275 μm.

In some embodiments, the thermally activated adhesive layer comprises an adhesive available from Akron Coating and Adhesives, Inc., e.g. ACA-40-004. Other suitable thermally activated adhesives are described in U.S. Pat. No. 6,753,379 to 3M Innovative Properties Company. In some embodiments, the thermally activated adhesive is in the form of a film. In some embodiments, the thermally activated adhesive is water-based. In some embodiments, the thermally activated adhesive is solvent-based.

In some embodiments, the thermally activated adhesive layer is substantially free of UV additives. In some embodiments, the thermally activated adhesive layer is completely free of UV additives. In some embodiments, the first thermoplastic polymeric resin layer is substantially free of UV additives. In some embodiments, the first thermoplastic polymeric resin layer is completely free of UV additives. In some embodiments, the second thermoplastic polymeric resin layer is substantially free of UV additives. In some embodiments, the second thermoplastic polymeric resin layer is completely free of UV additives.

In some embodiments, the first thermoplastic polymeric resin layer has a thickness of from about 75 μm to about 125 μm. In some embodiments, the first thermoplastic polymeric resin layer has a thickness of from about 80 μm to about 120 μm. In some embodiments, the first thermoplastic polymeric resin layer has a thickness of from about 85 μm to about 115 μm. In some embodiments, the first thermoplastic polymeric resin layer has a thickness of from about 90 μm to about 110 μm. In some embodiments, the first thermoplastic polymeric resin layer has a thickness of from about 95 µm to about 105 µm. In some embodiments, the first thermoplastic polymeric resin layer has a thickness of about 100 µm. In some embodiments, the first thermoplastic polymeric resin layer has a thickness of about 101 µm. In some embodiments, the first thermoplastic polymeric resin layer has a thickness of about 102 µm. In some embodiments, the first thermoplastic polymeric resin layer has a thickness of 101.6 µm.

In some embodiments, the multi-layer film further comprises a protective layer. In some embodiments, the protective layer comprises a polymer. In some embodiments, the protective layer comprises polyethylene terephthalate.

In some embodiments, the second thermoplastic polymeric resin layer comprises a polyurethane. In some embodiments, the second thermoplastic polymeric resin layer is a polyurethane based layer. In some embodiments, the polyurethane based layer comprises a hydrophilic polymer. In some embodiments, the polyurethane based layer comprises an isocyanate prepolymer having free isocyanate groups, and an organic solvent solution of a hydrophilic polyol and a surfactant having isocyanate-reactive functionality. In some embodiments, the hydrophilic polyol and the surfactant react with the free isocyanate groups in the isocyanate prepolymer to form the polyurethane backbone having both the hydrophilic moiety and the surfactant moiety chemically reacted therein and attached thereto. Suitable polyurethane based layers are described, for example, in U.S. Pat. No. 5,877,254.

In some embodiments, the surfactant has distinct hydrophilic and hydrophobic regions such that the desired interfacial tension between the surface and the condensing moisture is effectively reduced.

Cationic and anionic surfactants are preferred; however, non-ionic surfactants may also be useful, provided they are equipped with the reactive group functionality and exhibit the distinct hydrophilic and hydrophobic regions. In certain applications where non-ionic surfactants are used, they may be selected from ethoxylated or propoxylated alcohols, phenols, amides and amines. Non-ionic surfactants, however, are known to typically include isocyanate reactive groups such as hydroxyl groups.

Anionic and cationic surfactants rarely contain free, reactive groups. In some embodiments, wherein anionic and cationic surfactants are properly modified to include free reactive hydroxyl groups, or other groups which are reactive with isocyanate groups, such modifications will provide the necessary reaction site to incorporate into the polyurethane structure.

Ionic surfactants are preferred because they are often more effective wetting agents than non-ionic surfactants due to their ionic character. In the present invention, the surfactant anionics are free to migrate throughout the polymer complex since they are bound to the reacted cations by electrostatic interaction rather than covalent bonding.

In some embodiments, the isocyanate-reactive surfactant is selected from an anionic surfactant, a cationic surfactant, and a mixture thereof. Although hydroxyl-bearing surfactants are preferred, a number of other reactive groups on the surfactant are contemplated, including amino, carboxyl and thiol groups. The surfactant may bear more than one or one-type of isocyanate-reactive group. The ionic surfactants are preferably quaternary cationic surfactants or anionic surfactants having hydroxyl groups in the cation portion. More preferably, the surfactant is a non-ethoxylated hydrocarbon chain with greater than 16 carbon atoms. A non-limiting list of examples of suitable anionic surfactants includes monoethanolamine salts of sulfonic acids, diethanolamine salts of sulfonic acids, triethanolamine salts of sulfonic acids and mixtures thereof.

Typically, anionic surfactants rarely contain free, reactive hydroxyl groups in their structure. As such, these substances must be prepared to incorporate free hydroxyl or other isocyanate-reactive groups. Hydroxylation is accomplished by neutralizing a hydroxyl bearing quartenary ammonium base such a choline hydroxide with an acid such as dodecylbenzene sulfonic acid, as further described herein in the examples. Other hydroxyl-bearing ammonium compounds include but are not limited to triethylethanol-, diethyldiethano-, and ethyltriethanolammonium salts. A non-limiting list of suitable sulfonic acids from which the salts are prepared includes dodecylbenzene sulfonic acid, napthalene sulfonic acid, lignin sulfonic acids, petroleum sulfonic acids and paraffin sulfonic acids.

Examples of hydroxyl-containing cationic surfactants include, without limitation, ricinoleamidopropyl dimethylethyammonium ethosulfate, stearamidopropyl dimethylethanolammonium methasulfate and octadecylmothol diethanolammonium chloride.

In some embodiments, the polyols suitable for use in the present invention are of a hydrophilic character, and are capable of reacting with an isocyanate prepolymer to form a polyurethane chain. A non-limiting list of examples of suitable polyols for use in the present invention includes polyethylene glycol and ethylene glycol/propylene glycol copolymers and mixtures thereof. Other suitable hydrophilic polyols include polybutylene glycol, polyetheylene imine, amine-terminated polyethers and certain polyester polyols.

The isocyanate prepolymers contemplated for use with the present invention include those isocyanates containing reactive isocyanate groups and which are capable of forming polyurethane polymer chains as is well known to those skilled in the art. In preferred embodiments, the isocyanate prepolymer is a biuret or an isocyanurate of a diisocyanate. Most preferably, the diisocyanate is hexamethylene diisocyanate. Other useful diisocyanates include prepolymers of diisophorone diisocyanate, diphenylmethane diisocyanate, bis(methylcyclohexyl) diisocyanate and toluenediisocyanate. Blocking of the isocyanate group, for example with an oxime or phenol, and later removal of the protective group prior to reaction is also contemplated. When blocked isocyanates are employed, it is possible to use solvents or other compounds which, but for the protective group in the isocyanate, would react with and consume the isocyanate groups.

In some embodiments, the reflective surface coverings of the present invention provide a Yellow Index Rating of greater than 3. In other embodiments, the reflective surface coverings of the present invention provide a Yellow Index Rating of greater than or equal to 4.

Still further embodiments provide reflective surface coverings wherein the multi-layer film is optically clear.

In some embodiments, the reflective surface has a visible light reflectance of greater than 75%. In some embodiments, the reflective surface has a visible light reflectance of greater than 80%. In some embodiments, the reflective surface has a visible light reflectance of greater than 85%. In some embodiments, the reflective surface has a visible light reflectance of greater than 90%. In some embodiments, the reflective surface has a visible light reflectance of greater than 95%. In some embodiments, the reflective surface has a visible light reflectance of greater than 97.5%. In some embodiments, the reflective surface has a visible light reflectance of greater than 98%. In some embodiments, the reflective surface has a visible light reflectance of greater than 99%.

Some embodiments provide a reflective surface covering comprising: a substrate; and a multi-layer film comprising: a first thermoplastic polymeric resin layer; a thermally activated adhesive layer; and a second thermoplastic polymeric resin layer; wherein the thermally activated adhesive layer has a thickness of from about 140 µm to about 175 µm.

Some embodiments provide a reflective surface covering comprising: a substrate; and a multi-layer film comprising: a first thermoplastic polymeric resin layer; a thermally activated adhesive layer; and a second thermoplastic polymeric resin layer; wherein the thermally activated adhesive layer has a thickness of from about 140 µm to about 175 µm; and wherein the thermally activated adhesive layer is substantially free of a UV additive.

Other embodiments provide a method of preparing a reflective surface covering comprising: a) providing a reflective substrate and a multi-layer film comprising: a protective layer; and an anti-fog complex comprising: a first thermoplastic polymeric resin layer; a thermally activated adhesive layer; a second thermoplastic polymeric resin layer; b) laminating the multi-layer film and the reflective substrate together to form a laminated composite; c) maintaining the laminated composite in ambient conditions for a time sufficient to permit solidification of the multi-layer film; d) removing the protective layer from the laminated composite to expose the anti-fog complex; and e) performing a post-lamination cleaning cycle.

In some embodiments, the post-lamination cleaning phase comprises a first cleaning step and a second cleaning step.

In some embodiments, the second cleaning step is performed within 24 hours after completion of the first cleaning step. In some embodiments, the second cleaning step is performed at least 24 hours after the first cleaning step is completed.

In some embodiments, the second cleaning step is performed 30 minutes after completion of the first cleaning step. In some embodiments, the second cleaning step is performed one hour after completion of the first cleaning step. In some embodiments, the second cleaning step is performed two hours after completion of the first cleaning step. In some embodiments, the second cleaning step is performed four hours after completion of the first cleaning step. In some embodiments, the second cleaning step is performed 8 hours after completion of the first cleaning step. In some embodiments, the second cleaning step is performed twelve hours after completion of the first cleaning step. In some embodiments, the second cleaning step is performed eighteen hours after completion of the first cleaning step.

In some embodiments, the second cleaning step is performed from about 30 minutes to 24 hours after completion of the first cleaning step. In some embodiments, the second cleaning step is performed from about 1 hour to 18 hours after completion of the first cleaning step. In some embodiments, the second cleaning step is performed from about 2 hours to 12 hours after completion of the first cleaning step. In some embodiments, the second cleaning step is performed from about 4 hours to 10 hours after completion of the first cleaning step. In some embodiments, the second cleaning step is performed from about 6 hours to 8 hours after completion of the first cleaning step.

In some embodiments, exposure of the reflective surface covering to an environment having a relative humidity of greater than about 60% causes leaching or blooming of certain elements to the surface of the reflective surface covering, resulting in a white haze on that surface. Conventional methods of preparing reflective surface coverings have, heretofore, not been able to eliminate formation of this white haze.

In some embodiments, the anti-fog complex may be referred to as an anti-fog matrix. In those embodiments wherein the anti-fog complex is referred to as an anti-fog matrix, it is believed that one or more components of the anti-fog matrix releases one or more elements which present on the top surface of the reflective surface covering, under certain environmental conditions. In some embodiments, it is believed that these elements reach the top surface by permeating through the first thermoplastic polymeric resin layer. In other embodiments, it is believed that the presentation of these elements on the top surface is the result of a chemical reaction between an element of the second thermoplastic polymeric resin layer and an environmental constituent, which causes the element to emanate from the first thermoplastic polymeric resin layer.

In some embodiments, the first cleaning step comprises applying an alcohol based composition to the anti-fog complex. In some embodiments, the alcohol based composition is manually applied to the anti-fog complex. In some embodiments, the alcohol based composition is applied to the anti-fog complex using a roller. In some embodiments, the alcohol based composition is applied to the anti-fog complex using a paint roller.

In some embodiments, the first cleaning step further comprises removing the alcohol based composition from the anti-fog complex. In some embodiments, the first cleaning step further comprises removing the alcohol based composition from the anti-fog complex using a towel. In some embodiments, the towel comprises a natural fiber. In some embodiments, the towel is a cloth towel.

In some embodiments, the first cleaning step further comprises applying an alkaline solution to the anti-fog complex. In some embodiments, the alkaline solution is an ammonia based solution. In some embodiments, the alkaline solution is manually applied to the anti-fog complex. In some embodiments, the first cleaning step further comprises removing the alkaline solution from the anti-fog complex. In some embodiments, the alkaline solution is removed from the anti-fog complex using a cellulosic substrate. In some embodiments, the cellulosic substrate is a paper towel.

In some embodiments, the second cleaning step comprises applying an alcohol based composition to the anti-fog complex. In some embodiments, the second cleaning step further comprises removing the alcohol based composition from the anti-fog complex. In some embodiments, the second cleaning step further comprises removing the alcohol based composition from the anti-fog complex using a towel. In some embodiments, the towel comprises a natural fiber. In some embodiments, the towel is a cloth towel.

In some embodiments, the second cleaning step further comprises applying an alkaline solution to the anti-fog complex. In some embodiments, the alkaline solution is an ammonia based solution. In some embodiments, the alkaline solution is manually applied to the anti-fog complex. In some embodiments, the second cleaning step further comprises removing the alkaline solution from the anti-fog complex. In some embodiments, the alkaline solution is removed from the anti-fog complex using a cellulosic substrate. In some embodiments, the cellulosic substrate is a paper towel.

In some embodiments, the first cleaning step and/or the second cleaning step are automated.

In some embodiments, the step of laminating the multi-layer film and the reflective substrate together to form a laminated composite is performed in a cleanroom. As used herein, the term "clean room" is intended to refer to an environment having an ISO 14644-1 cleanroom standard of between ISO 1 and ISO 8.

In some embodiments, the laminated composite is maintained in an ambient environment for from about 48 to about 72 hours. In some embodiments, the laminated composite is maintained in an ambient environment, for about 48 hours. In some embodiments, the laminated composite is maintained in an ambient environment for about 72 hours. In some embodiments, the laminated composite is maintained in an ambient environment for at least 84 hours. In some embodiments, the laminated composite is maintained in an ambient environment for at least 96 hours.

In some embodiments, the reflective substrate and the multi-layer film are laminated together using a hot roll laminator. In some embodiments, the reflective substrate and the multi-layer film are laminated together in a cleanroom. In some embodiments, the hot roll laminator has a run speed of between about 1 foot/minute and about 10 feet/minute. In some embodiments, the hot roll laminator has a run speed of between about 2 feet/minute and about 9 feet/minute. In some embodiments, the hot roll laminator has a run speed of between about 3 feet/minute and about 8 feet/minute. In some embodiments, the hot roll laminator has a run speed of between about 4 feet/minute and about 7 feet/minute. In some embodiments, the hot roll laminator has a run speed of between about 4 feet/minute and about 6 feet/minute. In other embodiments, the hot roll laminator has a run speed of about 3 feet/minute. In other embodiments, the hot roll laminator has a run speed of about 4 feet/minute. In other embodiments, the hot roll laminator has a run speed of about 5 feet/minute.

In some embodiments, the reflective substrate is inspected for defects prior to laminating the multi-layer film and the reflective substrate together.

In some embodiments, the multi-layer film and the reflective substrate are laminated together at a pressure of from about 10 pounds per square inch (psi) to about 40 psi. In some embodiments, the multi-layer film and the reflective substrate are laminated together at a pressure of from about 15 psi to about 35 psi. In some embodiments, the multi-layer film and the reflective substrate are laminated together at a pressure of from about 20 psi to about 30 psi. In some embodiments, the multi-layer film and the reflective substrate are laminated together at a pressure of about 25 psi.

In some embodiments, the multi-layer film is maintained at a tension of from about 15 pounds to about 30 pounds during the laminating step. In other embodiments, the multi-layer film is maintained at a tension of from about 20 pounds to about 25 pounds during the laminating step.

In some embodiments, the hot roll laminator is maintained at a temperature of from about 105° C. to about 130° C. during the laminating step. In some embodiments, the hot roll laminator is maintained at a temperature of from about 110° C. to about 125° C. during the laminating step. In some embodiments, the hot roll laminator is maintained at a temperature of from about 115° C. to about 120° C. during the laminating step.

In some embodiments, the reflective substrate has a thickness of from about 2 mm to about 8 mm. In some embodiments, the reflective substrate has a thickness of from about 2 mm to about 6 mm. In some embodiments, the reflective substrate has a thickness of from about 2.5 mm to about 3.5 mm. In some embodiments, the reflective substrate has a thickness of from about 2.75 mm to about 3.25 mm. In some embodiments, the reflective substrate has a thickness of about 3 mm.

In some embodiments, the first thermoplastic polymeric resin layer; the thermally activated adhesive layer; and the second thermoplastic polymeric resin layer combine to form an anti-fog complex.

In some embodiments, the thermally activated adhesive comprises from about 50 wt. % to about 60 wt. % of the multi-layer film. In some embodiments, the thermally activated adhesive comprises about 55 wt. % of the multi-layer film. In some embodiments, the thermally activated adhesive comprises 53 wt. % of the multi-layer film.

In some embodiments, the first thermoplastic polymeric resin layer comprises from about 25 wt. % to about 45 wt. % of the multi-layer film. In some embodiments, the first thermoplastic polymeric resin layer comprises from about 30 wt. % to about 40 wt. % of the multi-layer film. In some embodiments, the first thermoplastic polymeric resin layer comprises about 35 wt. % of the multi-layer film.

In some embodiments, the second thermoplastic polymeric resin layer comprises from about 1 wt. % to about 10 wt. % of the multi-layer film. In some embodiments, the second thermoplastic polymeric resin layer comprises from about 2 wt. % to about 8 wt. % of the multi-layer film. In some embodiments, the second thermoplastic polymeric resin layer comprises from about 3 wt. % to about 6 wt. % of the multi-layer film. In some embodiments, the second thermoplastic polymeric resin layer comprises about 4 wt. % of the multi-layer film.

In those embodiments wherein the multi-layer film includes a protective layer, the protective layer may comprise from about 2 wt. % to about 15 wt. % of the multi-layer film. In other embodiments wherein the multi-layer film includes a protective layer, the protective layer may comprise from about 5 wt. % to about 12 wt. % of the multi-layer film. Still further embodiments provide a multi-layer film having a protective layer, wherein the protective layer comprise about 8 wt. % of the multi-layer film.

In some embodiments, each layer of the multi-layer film has a particular arrangement. In some embodiments, the first thermoplastic polymeric resin layer is positioned between the thermally activated adhesive layer and the second thermoplastic polymeric resin layer. In those embodiments wherein the multi-layer film further comprises a protective layer, the protective layer is adjacent to the second thermoplastic polymeric resin layer. In some embodiments wherein the multi-layer film further comprises a protective layer, there are no intervening layers between the protective layer and the second thermoplastic polymeric resin layer.

In some embodiments, the second thermoplastic polymeric resin layer forms the top surface of the multi-layer film. In those embodiments wherein the multi-layer film comprises a protective layer, the protective layer forms the top surface of the multi-layer film.

In some embodiments, the first thermoplastic polymeric resin layer is positioned between the thermally activated adhesive layer and the second thermoplastic polymeric resin layer, such that there are no intervening layers between the first thermoplastic polymeric resin layer and the thermally activated adhesive layer. In some embodiments, the first thermoplastic polymeric resin layer is positioned between the thermally activated adhesive layer and the second thermoplastic polymeric resin layer, such that there are no intervening layers between the first thermoplastic polymeric resin layer and the second thermoplastic polymeric resin layer. In some embodiments, the first thermoplastic polymeric resin layer is positioned between the thermally activated adhesive layer and the second thermoplastic polymeric resin layer, such that there are no intervening layers between the first thermoplastic polymeric resin layer and the second thermoplastic polymeric resin layer or any intervening layers between the first thermoplastic polymeric resin layer and the thermally activated adhesive layer.

In some embodiments, each layer of the anti-fog complex has a particular arrangement. In some embodiments, the first thermoplastic polymeric resin layer is positioned between the thermally activated adhesive layer and the second thermoplastic polymeric resin layer of the anti-fog complex. In some embodiments, the second thermoplastic polymeric resin layer forms the top surface of the anti-fog complex. In some embodiments, the anti-fog complex does not contain any intervening layers between the first thermoplastic polymeric resin layer and the thermally activated adhesive layer. In some embodiments, the anti-fog complex does not contain any intervening layers between the first thermoplastic polymeric resin layer and the second thermoplastic polymeric resin layer. In some embodiments, the anti-fog complex does not contain any intervening layers between the first thermoplastic polymeric resin layer and the second thermoplastic polymeric resin layer or any intervening layers between the first thermoplastic polymeric resin layer and the thermally activated adhesive layer.

The invention will be described in greater detail by way of specific examples. The following examples are offered for illustrative purposes and are not intended to limit the invention in any manner. Those skilled in the art will readily recognize a variety of noncritical parameters, which can be changed or modified to yield essentially the same results.

EXAMPLES

Example 1

Table 1 (below) describes the results of evaluations performed on exemplary reflective surface coverings of the present invention and comparative surface coverings. All surface coverings are evaluated for discoloration, quality of lamination and functionality; and an aggregate pass/fail rating is assigned. A surface covering which does not meet the standard for discoloration, quality of lamination or functionality receives a "Fail" rating.

Discoloration (e.g. yellowing of the product) and quality of lamination are assessed by visual inspection; and functionality is assessed by visible light reflectance.

TABLE 1

| Example | Thickness (μm) | | | Pass/Fail |
|---|---|---|---|---|
| | Adhesive | PET | Adhesive | |
| Ex. I | 152.4 | 101.6 | A* | Pass |
| Ex. II | 152.4 | 101.6 | A | Pass |
| Comp. Ex. I | 152.4 | 50.8 | A | Fail |
| Comp. Ex. II | 152.4 | 50.8 | B** | Fail |
| Comp. Ex. III | 152.4 | 101.6 | B | Fail |
| Comp. Ex. IV | 177.8 | 50.8 | A | Fail |
| Comp. Ex. V | 177.8 | 101.6 | B | Fail |
| Comp. Ex. VI | 152.4 | 50.8 | A | Fail |
| Comp. Ex. VII | 152.4 | 50.8 | A | Fail |
| Comp. Ex. VIII | 152.4 | 101.6 | C*** | Fail |
| Comp. Ex. IX | 88.9 | 101.6 | B | Fail |
| Comp. Ex. X | 63.5 | 101.6 | B | Fail |
| Comp. Ex. XI | 114.3 | 101.6 | B | Fail |
| Comp. Ex. XII | 38.1 | 101.6 | B | Fail |

*Thermally activated adhesive
**Hot melt adhesive
***Adhesive + UV additive

The results described in Table 1 (above) demonstrate that exemplary reflective surface coverings of the present invention meet the quality standards for discoloration, quality of lamination and functionality, while the comparative reflective surface coverings fail to meet at least one of these quality standards.

Example 2

Reflective surface coverings prepared according to exemplary methods of the present invention and reflective surface coverings prepared in accordance with comparative methods are evaluated. The exemplary methods of the present invention included first and second cleaning steps, while the comparative methods did not. The surface coverings are visually inspected for the presence of white haze on the top surface. Remarkably, reflective surface coverings prepared by comparative methods possess a white haze on the top surface; whereas reflective surface coverings prepared in accordance with exemplary methods of the present invention are free of white haze.

It is intended that any patents, patent applications or printed, publications, including books, mentioned in this patent document be hereby incorporated by reference in their entirety.

As those skilled in the art will appreciate, numerous changes and modifications may be made to the embodiments described herein, without departing from the spirit of the invention. It is intended that all such variations fall within the scope of the invention.

The invention claimed is:

1. A reflective surface covering comprising:
   a reflective substrate; and
   a multi-layer film comprising:
      a first thermoplastic polymeric resin layer;
      a thermally activated adhesive layer; and
      a second thermoplastic polymeric resin layer;
   wherein the thickness ratio between the thermally activated adhesive layer and the first thermoplastic polymeric resin layer is from about 1.25:1 to about 2.75:1.

2. The reflective surface covering according to claim 1, wherein the reflective surface covering has a scratch/dig ratio between 120/80 and 10/5.

3. The reflective surface covering according to claim 1, wherein the multi-layer film has a thickness of from about 250 μm to about 300 μm.

4. The reflective surface covering according to claim 1, wherein the multi-layer film is substantially free of a UV additive.

5. The reflective surface covering according to claim 1, wherein the first thermoplastic polymeric resin layer has a thickness of from about 75 μm to about 125 μm.

6. The reflective surface covering according to claim 1, wherein the multi-layer film further comprises a protective layer.

7. The reflective surface covering according to claim 1, wherein the second thermoplastic polymeric resin layer comprises a polyurethane.

8. The reflective surface covering according to claim 7, wherein the second thermoplastic polymeric resin layer further comprises a hydrophilic polymer.

9. The reflective surface covering according to claim 1, having a Yellow Index Rating of greater than 3.

10. A reflective surface covering comprising:
a reflective substrate; and
a multi-layer film comprising:
- a first thermoplastic polymeric resin layer;
- a thermally activated adhesive layer that is substantially free of a UV additive; and
- a second thermoplastic polymeric resin layer;
wherein the thickness ratio between the thermally activated adhesive layer and the first thermoplastic polymeric resin layer is from about 1.25:1 to about 2.75:1.

11. The reflective surface covering according to claim 10, wherein the reflective surface covering has a scratch/dig ratio between 120/80 and 10/5.

12. The reflective surface covering according to claim 10, wherein the multi-layer film has a thickness of from about 250 μm to about 300 μm.

13. The reflective surface covering according to claim 10, wherein the first thermoplastic polymeric resin layer has a thickness of from about 75 μm to about 125 μm.

14. The reflective surface covering according to claim 10, wherein the multi-layer film further comprises a protective layer.

15. The reflective surface covering according to claim 10, wherein the second thermoplastic polymeric resin layer comprises a polyurethane.

16. The reflective surface covering according to claim 10, wherein the second thermoplastic polymeric resin layer further comprises a hydrophilic polymer.

17. A reflective surface covering comprising:
a reflective substrate; and
a multi-layer film adhered to the reflective substrate, the multi-layer film comprising:
- a first thermoplastic polymeric resin layer;
- a thermally activated adhesive layer that is substantially free of a UV additive; and
- a second thermoplastic polymeric resin layer;
wherein the thickness ratio between the thermally activated adhesive layer and the first thermoplastic polymeric resin layer is from about 1.25:1 to about 2.75:1 and there are no intervening layers between.

18. The reflective surface covering according to claim 17, wherein the multi-layer film has a thickness of from about 250 μm to about 300 μm.

19. The reflective surface covering according to claim 17, wherein the first thermoplastic polymeric resin layer has a thickness of from about 75 μm to about 125 μm.

20. The reflective surface covering according to claim 17, wherein the first thermoplastic polymeric resin layer comprises a polyethylene terephthalate.

* * * * *